3,301,920
DIEPOXIDE FORMED BY THE CONDENSATION OF A MONOHYDROXYALIPHATIC MONOGLYCIDYL ETHER WITH A DIALKYL ESTER OF A CARBOXYLIC ACID
Herbert P. Price, Louisville, Ky., assignor, by mesne assignments, to Celanese Coatings Company, a corporation of Delaware
No Drawing. Filed Oct. 17, 1963, Ser. No. 317,043
6 Claims. (Cl. 260—837)

This invention in one of its aspects relates to novel polyepoxide resins. More specifically, this invention relates to polyepoxide resins containing polyester groups. In another of its aspects, the invention relates to methods for preparation of resins containing both epoxide groups and ester groups, such resins hereinafter being referred to as polyepoxide-polyester resins. In still another of its aspects, the invention relates to cross-linked polymers prepared from these polyepoxide-polyester resins.

Polyepoxide resins are well known compositions which have many significant commercial applications. These resins have found use in the production of industrial castings, surface coatings, high-strength adhesives, durable laminates, cold solders, lightweight foams, and potting compounds for all varieties of electrical and electronic apparatus. Polyester resins are also well known compositions, such compositions being known as alkyd resins, which have found great utility in the surface coating field; high molecular weight polyesters, which have been used for fibers and free films; and unsaturated polyester resins, which in combination with styrene have been used to prepare durable laminates and potting compounds.

This invention contemplates the production of resins which combine properties of polyepoxide resins and polyester resins by the incorporation of epoxy groups and ester groups in the same molecules. Such compositions can be can be polymerized and cross-linked by the use of conventional epoxy curing agents. Also, when the ester component contains polymerizable unsaturation, the composition can be cured by a combination of epoxy curing agents and vinyl polymerization catalysts with or without the addition of a vinyl monomer.

The polyepoxide-polyester resins contemplated by this invention are prepared by reacting two mols of a hydroxyl containing monoepoxide with one mol of a dialkyl ester of a dicarboxylic acid. The said hydroxyl containing monoepoxide is a diether of a dihydric phenol, the ether substituents being a mono (hydroxyaliphatic) ether group and a monoglycidyl ether group. The reaction that occurs is an ester interchange or alcoholysis reaction wherein each ester group of the diester reacts with the hydroxyl group of the diether forming a new ester while liberating alcohol. This reaction can best be represented by the following equation:

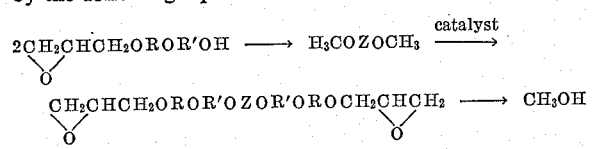

In this equation, R represents the aromatic nucleus of a dihydric phenol; R' is a divalent radical containing at least two carbon atoms such as aliphatic hydrocarbon groups, hydrocarbon substituted aliphatic hydrocarbon groups, and hydrocarbon ether substituted aliphatic hydrocarbon groups; and Z is the acyl diradical of a dicarboxylic acid, for example, adipoyl, fumaroyl, phthaloyl, and the like.

The mono (hydroxyaliphatic), monoglycidyl diethers of dihydric phenols, from which these polyepoxide-polyester resins are prepared, are made by a two-step process involving first preparing the mono (hydroxyaliphatic) ether of a dihydric phenol, described in U.S. 3,033,818 and U.S. 3,033,821, and then reacting this compound with epichlorohydrin. Such compositions are fully described in application Serial Number 260,040 filed Feb. 20, 1963, now abandoned.

The mono (hydroxyaliphatic) ethers of dihydric phenols can be readily prepared by reacting one mol of a dihydric phenol with one mol of a simple or substituted aliphatic chlorohydrin using sodium hydroxide as the condensing or dehydrohalogenating agent; of by reacting one mol of a dihydric phenol with one mol of a simple or substituted aliphatic cyclic carbonate using potassium carbonate as the catalyst; or by reacting one mol of a dihydric phenol with one mol of a simple or substituted monoepoxide. These mono (hydroxyaliphatic) ethers of dihydric phenols can be represented by the formula

HOROR'OH wherein R and R' have the meanings hereinbefore defined.

Examples of mono (hydroxyaliphatic) ethers of dihydric phenols are the mono (hydroxyethyl) ether of bisphenol, in which R is the aromatic residue of bisphenol and R' is the —CH$_2$CH$_2$— group, and the mono (hydroxypropyl) ether of resorcinol, wherein R is the aromatic residue of resorcinol and R' is the

group. These groups are representative of aliphatic hydrocarbon groups.

Other mono (hydroxyaliphatic) ethers are those prepared by reacting one mol of a dihydric phenol with one mol of styrene oxide. Here the hydrocarbon substituted aliphatic hydrocarbon group is

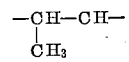

The reaction of phenyl glycidyl ether and a dihydric phenol produces a hydrocarbon ether substituted aliphatic hydrocarbon group,

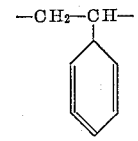

Other simple or substituted hydroxyaliphatic derivatives can be produced by varying the monoepoxide, cyclic carbonate, or chlorohydrin.

The dihydric phenols used to prepare these mono (hydroxyaliphatic) derivatives are those which have been used heretofore in preparing epoxide resins. Such dihydric phenols include resorcinol, hydroquinone, and p,p'-dihydroxy diphenyl propane (bisphenol).

The diethers used in this invention are prepared by reacting the above described mono (hydroxyaliphatic) ethers of dihydric phenols with excess epichlorohydrin using sodium or potassium hydroxide equivalent to the phenolic hydroxyl content of the starting material. In this reaction, epichlorohydrin reacts with the phenolic hydroxyl group leaving the aliphatic hydroxyl group unreacted. This reaction is illustrated by the following equation, in which R and R' have the same meaning as hereinbefore defined:

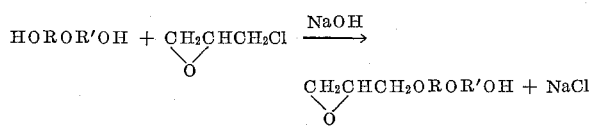

Such diethers can be the mono (hydroxyethyl), monoglycidyl diether of bisphenol, the mono (hydroxypropyl), monoglycidyl diether of resorcinol, the mono (hydroxybutyl), monoglycidyl diether of hydroquinone, etc.

The diesters used in the process of this invention are dialkyl esters of dicarboxylic acids. Such esters can be dimethyl esters, diethyl esters, methyl-ethyl esters, dibutyl esters, and the like. However, the preferred esters are the methyl and ethyl esters, since the corresponding methyl and ethyl alcohols, which are liberated in the interchange reaction, are easier to remove from the reaction zone due to their lower boiling points. The acids from which these esters are derived can be any of the well known dicarboxylic acids, including both aliphatic and aromatic types. Such acids can be represented by the general formula

HOZOH

Z being an acyl radical as defined hereinbefore. When the dibasic acid is phthalic acid, Z is the

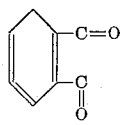

group; when it is adipic acid, Z is the

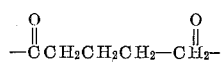

group; when it is maleic or fumaric acid, Z is the

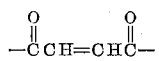

group. Other acids which are within the scope of this invention are oxalic, malonic, succinic, azelaic, glutaric, pimelic, suberic, sebacic, maleic, fumaric, isophthalic, terephthalic acids, and the like.

The alcoholysis reaction between the mono (hydroxyaliphatic), monoglycidyl diether of a dihydric phenol and the dialkyl ester is conducted at temperatures of 100° C. to 220° C., the preferred range being 150° C. to 200° C. The reaction is normally conducted at atmospheric pressures, but vacuum can be applied at the end of the reaction to facilitate removal of the liberated alkanol.

Many catalysts have been used in ester interchange and alcoholysis reactions, for example, phosphoric acid, sulfonic acid, alkyl and aryl substituted phosphoric and sulfonic acids, sodium hydride, sodium alkoxides, alkali metal carbonates, alkaline earth carbonates, aluminum alkoxides, tin and titanium organic esters, wherein the tin or titanium atom is bonded through an oxygen atom to a carbon atom free of any double bond with oxygen, and the like. However, in conducting the process of this invention, care must be exercised in the choice or use of these catalysts due to the presence of the reactive epoxide groups. Acidic and basic materials can react with the epoxide groups producing undesirable side reactions with resulting diminution of epoxide content of the final product. When using strongly acidic or basic catalysts, catalytic quantities, in the range of 0.01 percent to 0.5 percent of the reaction mixture should be used in order to prevent excessive reaction of the epoxide groups. The preferred catalysts of this invention are compounds which are weakly acidic or basic. Such compounds are potassium carbonate, calcium carbonate, aluminum isopropoxide, tetrabutyl tin, tetraisopropyl titanate, tetrabutyl titanate, tetra-2-ethylhexyl titanate, tetrast titanate and the like . These catalysts are used in amounts in the range of 0.01 to 5 percent based on the weight of the initial reactants.

The following examples will illustrate, in detail, the process of this invention, it being understood that this invention is not limited by the details of these examples. Parts used in these examples are parts by weight.

*Example A*

To a five-liter flask equipped with stirrer, reflux condenser and thermometer are added 1368 parts of bisphenol and 558 parts of ethylene carbonate. Heat and stirring are applied, melting and dissolving these components. At 115° C., 12 parts of potassium carbonate catalyst are added, and heating is continued. At 162° C., carbon dioxide gas begins to evolve. The temperature is gradually raised to 200° C. and held between 200° C. and 212° C. for one hour. Vacuum (20–35 mm. Hg pressure) is applied to ensure complete reaction by removal of all carbon dioxide.

This mono(hydroxyethyl) ether of bisphenol is dissolved in 3000 parts of epichlorohydrin. 252 parts of sodium hydroxide are added to the flask in six equal increments. After each addition of sodium hydroxide, the temperature is raised to 95° C. to 100° C. both by the exothermic nature of the reaction and by the application of external heat. The temperature is lowered to 70° C. to 80° C. before each incremental addition. After the final addition of caustic, water is removed as an epichlorohydrin-water azeotrope to a pot temperature of 127° C. The flask contents are cooled and the salt is removed by filtration. The remaining unreacted epichlorohydrin is removed by vacuum distillation to a pot temperature of 150° C.

The resinous product is dissolved in 1500 parts of methyl isobutyl ketone and heated. At 85° C., 1000 parts of water are added, followed by the addition of 90 parts of sodium hydroxide. The temperature is raised to reflux (92° C. to 93° C.) and held at reflux for one hour. Heat is removed and stirring is stopped. The water layer is drawn off, and an additional 1000 parts of water are added. The flask contents are neutralized with 30 percent sulfuric acid. The water layer is drawn off and the solvent is removed by vacuum distillation (20–25 mm. Hg pressure) to 150° C. The product is then filtered. This material, the monohydroxyethyl-monoglycidyl diether of bisphenol, has an epoxide equivalent weight of 380 and no active chlorine content.

*Example B*

To a one-liter flask equipped with thermometer, stirrer, and reflux condenser are added 228 parts of bisphenol, 150 parts of methyl isobutyl ketone and 2 parts of potassium carbonate. Heat is applied, raising the temperature to 80° C. Slow addition of 65 parts of propylene oxide is begun and continued over a two hour period, holding the temperature between 80° C. and 90° C. After the addition of propylene oxide is completed, heating is continued for 2.5 hours, allowing the temperature to rise to 118° C. The solvent is then removed by heating to 160° C. under 20–25 mm. Hg pressure.

This product, the mono (hydroxypropyl) ether of bisphenol, is then reacted with 500 parts of epichlorohydrin, and 44 parts of sodium hydroxide using the same procedure as described in Example A. The resulting monohydroxypropyl-monoglycidyl diether of bisphenol has an epoxide equivalent weight of 330 and an active chlorine content of 0.04 percent.

*Example 1*

To a one-liter flask equipped with stirrer, thermometer and downward distillation thermometer are added 330 parts of the monohydroxyethyl-monoglycidyl diether of bisphenol and 87 parts of dimethyl adipate. Stirring is applied to blend these components together. When a clear solution is obtained, 4 parts of tetraisopropyl titanate are added as catalyst. Heat is applied and at 178° C., methanol begins to distil over. The temperature is gradually raised to 200° C. and held at 200° C. for thirty minutes. The reactants are then cooled to 140° C. where vacuum is applied (20–25 mm. Hg pressure) to facilitate methanol removal. Heat is reapplied until the temperature reaches 200° C. The flask contents are then cooled. The product (369 parts) has an epoxide equivalent weight of 606.

Example 2

Using the same equipment and procedure as described in Example 1, 108 parts of dimethyl azelate are reacted with 330 parts of the monohydroxyethyl-monoglycidyl diether of bisphenol using 4 parts of tetraisopropyl titanate catalyst. These components are heated to 184° C. where methanol begins to distil over. The temperature is held at 200° C. for thirty minutes and is then cooled to 148° C. where vacuum is applied (20–25 mm. Hg pressure). The temperature is then raised to 200° C. to ensure completeness of the reaction. The product (411 parts) has an epoxide equivalent weight of 620.

Example 3

By the procedure described in the previous examples, 97 parts of dimethyl isophthalate are reacted with 330 parts of the monohydroxyethyl-monoglycidyl diether of bisphenol using 4 parts of tetraisopropyl titanate catalyst. The product (400 parts) has an expoxide equivalent weight of 621.

Example 4

Following Example 1, 55 parts of dimethyl fumarate are reacted with 252 parts of the monohydroxyethyl-monoglycidyl diether of bisphenol using 3 parts of tetraisopropyl titanate catalyst. The product (288 parts) has an epoxide equivalent weight of 543.

Example 5

Following the preceding examples, 300 parts of the monohydroxypropyl-monoglycidyl diether of bisphenol and 63 parts of dimethyl maleate are mutually dissolved in a one-liter flask. 3.6 parts of tetraisopropyl titanate are added as catalyst. Heat is applied and, at 190° C., distillate begins to come over. The temperature is held at 200° C. for thirty minutes, and then cooled. Vacuum (20–25 mm. Hg pressure) is applied to facilitate distillate removal, heating the reactants from 150° C. to 200° C. The product (345 parts) has an epoxide equivalent weight of 458.

The polyepoxide-polyester resins of this invention can be cured by the use of any of the conventional epoxide resin curing agents. Such agents are amines which include primary and secondary amines such as ethylene diamine, diethylene triamine, tetraethylene pentamine, metaphenylene diamine, diamino-diphenyl sulfone, methylene dianiline and the like; tertiary amines such as benzyl dimethyl amine, dimethyl amino-phenol, triethanol amine, and the like. Also included among these amino compounds are the so-called polyamido amines which are the reaction products of polymeric fatty acids and polyamines.

Anhydride curing agents are also contemplated for use in curing the products of this invention. Typical anhydrides include phthalic anhydride, tetrahydrophthalic anhydride, hexahydrophthalic anhydride, dodecenyl-succinic anhydride, and pyromellitic dianhydride.

Additional polyepoxide curing agents that can be reacted with the products of this invention are polybasic acid anhydrides and Friedel-Crafts catalysts, such as oxalic acid, succinic acid, boron trifluoride and stannic chloride.

When the polyepoxide-polyester resins of this invention contain polymerizable unsaturation, that is, when the acid portion of the polyester is an unsaturated acid, such as fumaric or maleic acid, the composition can be polymerized by the use of a vinyl polymerization catalyst. Examples of typical catalysts are peroxide initiators, for instance, methyl ethyl ketone peroxide, cumene hydroperoxide, lauroyl peroxide, benzoyl peroxide and di-tertiary-butyl peroxide. When reacting polyepoxide-polyester resins which contain polymerizable unsaturation, it is preferred to cure these resins by the use of a combination of epoxide resin curing agents and vinyl polymerization catalysts. Vinyl monomers can also be blended with and coreacted with the resins. Such monomers include styrene, vinyl toluene, and the alkyl acrylate esters, the preferred monomers being styrene. The amount of vinyl monomer that can be used in combination with the polyepoxide-polyester resin is in the range of 20 percent to 50 percent by weight of the reaction mixture.

The curing reactions can be carried out at room temperature or at elevated temperature depending upon the curing agent and the desired end use of the cured products. The following examples will illustrate these curing reactions, it being understood that this invention is not limited thereto. Parts in these examples are parts by weight.

Example 6

200 parts of the product of Example 1 are heated with 50 parts of hexahydrophthalic anhydride to 73° C. until a clear solution is obtained. 0.7 part of dimethylamino phenol is then added. The mixture is thoroughly evacuated under vacuum to remove entrapped air and is poured into a preheated mold, coated with a mold release. The mold consists of two aluminum plates of approximately 10 x 12 x 0.25 inch dimensions, the two plates being held apart by 1/8 inch thick aluminum strips placed along three sides of the plates. The composition is cured by heating for 16 hours at 150° C.

The resulting casting has a tensile strength of 6,713 p.s.i., a flexure strength of 15,509 p.s.i., and Izod impact of 0.45 ft. lb. per inch of notch, a hardness of 88 on the Shore "D" scale and water absorption of 0.20 percent.

Example 7

200 parts of the product of Example 2 are blended with 50 parts of hexahydrophthalic anhydride and 0.7 part of dimethylamino phenol at 75° C. After evacuation of entrapped air, the resin mixture is poured into a preheated mold and cured by heating at 150° C. for 16 hours.

This casting has a tensile strength of 6,672 p.s.i., a flexure strength of 12,664 p.s.i., an Izod impact of 0.65 ft. lb. per inch of notch, a Shore "D" hardness of 86 and a water absorption of 0.17 percent.

Example 8

The product of Example 3 (200 parts) is cured by the procedure of the preceding examples with 50 parts of hexahydrophthalic anhydride and 0.7 part of dimethylamino phenol.

The resulting casting has a tensile strength of 9,241 p.s.i., flexure of 19,374 p.s.i., Izod impact of 0.43 ft. lb. per inch of notch, a Shore "D" hardness of 90, and water absorption of 0.15 percent.

Example 9

The product of Example 4 contains vinyl unsaturations as well as epoxide groups. This composition is cured with an epoxide hardener (hexahydrophthalic anhydride), a vinyl type hardener (methylethyl ketone peroxide), and a vinyl monomer (styrene).

200 parts of the product of Example 4 are blended with 56.8 parts of hexahydrophthalic anhydride, 110 parts of styrene and 1.25 parts of a 60 percent solution of methylethyl ketone peroxide in dimethyl phthalate at 60° C. After evacuation of the entrapped air, the resin composition is poured into a mold and heated for 4 hours at 65° C. The casting is then heated for 16 hours at 150° C.

The resulting casting has a tensile strength of 11,567 p.s.i., Izod impact of 0.36, flexure of 21,067 p.s.i., Shore "D" hardness of 92, and water absorption of 0.1 percent.

Example 10

Using the same procedure as described in Example 9, 200 parts of the product of Example 5 are blended with 77.4 parts of hexahydrophthalic anhydride, 114.6 parts of styrene and 1.25 parts of methylethyl ketone peroxide. A cured casting is obtained by heating this composition for 22 hours at 65° C. and 7 hours at 150° C.

The resulting casting has tensile strength of 9,942 p.s.i., flexure of 14,706 p.s.i., Izod impact of 0.41, hardness of 90 (Shore "D") and water absorption of 0.11 percent.

What is claimed is:

1. 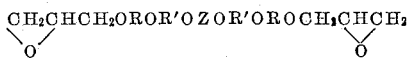

wherein R is the aromatic nucleus of a dihydric phenol; R' is a divalent radical containing at least two carbon atoms and selected from the group consisting of aliphatic hydrocarbon groups, hydrocarbon substituted aliphatic hydrocarbon groups and hydrocarbon ether substituted aliphatic hydrocarbon groups; and Z is an acyl diradical of a dicarboxylic acid.

2. The composition of claim 1 wherein the dihydric phenol is p,p'-dihydroxy-diphenyl propane; the divalent radical is the —$CH_2CH_2$— group; and the dicarboxylic acid is adipic acid.

3. The composition of claim 1 wherein the dihydric phenol is resorcinol; the divalent radical is the

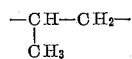

group; and the dicarboxylic acid is fumaric acid.

4. The cured product resulting from the reaction of the composition of claim 2 with hexahydrophthalic anhydride.

5. The cured product resulting from the reaction of the composition of claim 3 with phthalic anhydride, methylethyl ketone peroxide and styrene.

6. A process for preparing a polyepoxide-polyester composition which comprises condensing a monohydroxyaliphatic, monoglycidyl diether of a dihydric phenol with a dialkyl ester of a dicarboxylic acid by an ester interchange reaction with concomitant removal of liberated alkanol.

References Cited by the Examiner
UNITED STATES PATENTS 3,215,757   11/1965   Scheibli et al. _____ 260—830

MURRAY TILLMAN, *Primary Examiner.*

GEORGE F. LESMES, *Examiner.*

P. LIEBERMAN, *Assistant Examiner.*